(12) United States Patent
Jutila et al.

(10) Patent No.: US 9,150,259 B2
(45) Date of Patent: Oct. 6, 2015

(54) TAILGATE WITH TONNEAU COVER FOR A VEHICLE

(71) Applicant: GM GLOBAL TECHNOLOGY OPERATIONS LLC, Detroit, MI (US)

(72) Inventors: Brian J. Jutila, Richmond, MI (US); Jeffrey A. Diegel, South Lyon, MI (US); Ronald J. Wojciechowski, Sterling Heights, MI (US)

(73) Assignee: GM Global Technologies Operations LLC, Detroit, MI (US)

( * ) Notice: Subject to any disclaimer, the term of this patent is extended or adjusted under 35 U.S.C. 154(b) by 0 days.

(21) Appl. No.: 14/163,123

(22) Filed: Jan. 24, 2014

(65) Prior Publication Data

US 2015/0210321 A1    Jul. 30, 2015

(51) Int. Cl.
*B60P 7/04*  (2006.01)
*B62D 33/027*  (2006.01)

(52) U.S. Cl.
CPC ............... *B62D 33/0273* (2013.01); *B60P 7/04* (2013.01)

(58) Field of Classification Search
CPC ............ B60J 11/02; B60J 11/00; B60J 7/068; B60J 7/0015; B60J 7/085; B60P 7/04; B60P 7/02
USPC .......................... 296/57.1, 100.09, 136.01, 98
See application file for complete search history.

(56) References Cited

U.S. PATENT DOCUMENTS

| | | | |
|---|---|---|---|
| 6,053,556 A * | 4/2000 | Webb | 296/98 |
| 8,087,713 B2 | 1/2012 | Schrader et al. | |
| 2010/0140973 A1 * | 6/2010 | Duncan | 296/100.09 |

* cited by examiner

*Primary Examiner* — Joseph D Pape
*Assistant Examiner* — Dana Ivey
(74) *Attorney, Agent, or Firm* — Quinn Law Group, PLLC

(57) ABSTRACT

A vehicle having a front wall, two side walls, and a truck bed that altogether define a tonneau is provided. The vehicle includes a tailgate that has a front panel, a rear panel, two side panels, and a top panel that altogether define a cavity. The tailgate also has a tonneau cover deployable from and retractable to within the cavity. The tonneau cover is selectively movable between a stowed position, a deployed position, and a partially deployed position. In the stowed position, the tonneau cover is substantially within the cavity. In the deployed position, the tonneau cover substantially covers the tonneau of the vehicle. The partially deployed position is any position between the stowed position.

18 Claims, 2 Drawing Sheets

TAILGATE WITH TONNEAU COVER FOR A VEHICLE

TECHNICAL FIELD

The present invention relates to a tailgate with a tonneau cover for a vehicle.

BACKGROUND

Many vehicles have a tonneau, or open compartment, usually at the rear of the vehicle, to haul and/or store cargo. The vehicle may include a tonneau cover assembly to conceal and protect the interior of the tonneau and any of the cargo therewithin. In addition, tonneau covers may improve aerodynamic performance of the vehicle by reducing drag. Tonneau covers are attached or secured to the vehicle, and may be made of rigid panels that are foldable and/or removable, or a flexible fabric material that may be rolled up and stored when not in use, often in the tonneau itself. Provisions for the tonneau cover, including, but not limited to, rails or a track built into the frame of the vehicle, may be provided by the vehicle manufacturer. Alternatively, after-market kits are available, and may require owners of the vehicles to install the provisions themselves, which may involve drilling into the vehicle frame.

SUMMARY

A tailgate for a vehicle is provided. The vehicle generally has a front wall, two side walls, and a truck bed that altogether define a tonneau. The tailgate includes a front panel, a rear panel, two side panels, and a top panel that altogether define a cavity. In one embodiment, at least one of the top panel and the front panel define an opening through which the cavity is accessible. In another embodiment, the top panel has a front portion and a rear portion, where the front portion is removable from at least the rear portion to form the opening.

In either embodiment, the tailgate also includes a tonneau cover deployable from and retractable to within the cavity through the opening. The tonneau cover is selectively movable between a stowed position, a deployed position, and a partially deployed position. In the stowed position, the tonneau cover is substantially within the cavity. In the deployed position, the tonneau cover substantially covers the tonneau of the vehicle. The partially deployed position is any position between the stowed position and the deployed position.

A vehicle is further provided. The vehicle includes a front wall, two side walls, and a truck bed that altogether define a tonneau. The vehicle also includes any of the tailgates described above.

The above features and advantages and other features and advantages of the present invention are readily apparent from the following detailed description of the best modes for carrying out the invention when taken in connection with the accompanying drawings.

DETAILED DESCRIPTION

Those having ordinary skill in the art will recognize that terms such as "above," "below," "upward," "downward," et cetera, are used descriptively of the figures, and do not represent limitations on the scope of the invention, as defined by the appended claims. Any numerical designations, such as "first" or "second" are illustrative only and are not intended to limit the scope of the invention in any way.

Figure 1:
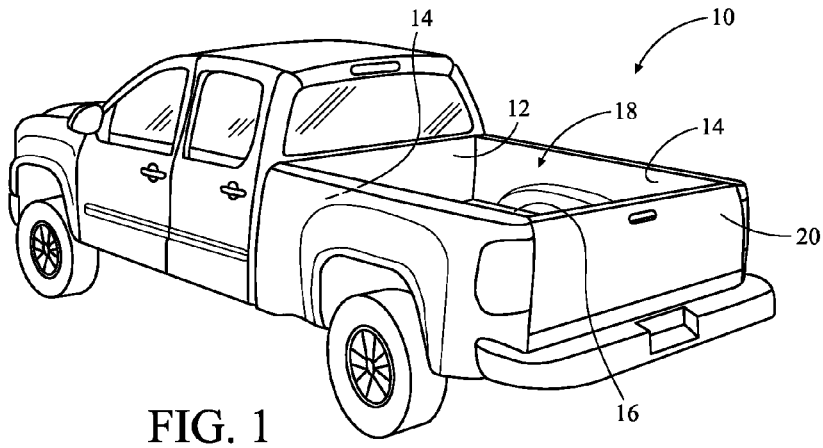
FIGS. 1, 2, and 3 are schematic, perspective views of a vehicle with a tailgate having a tonneau cover in a stowed position, a deployed position, and a partially deployed position, respectively.
Figure 2:
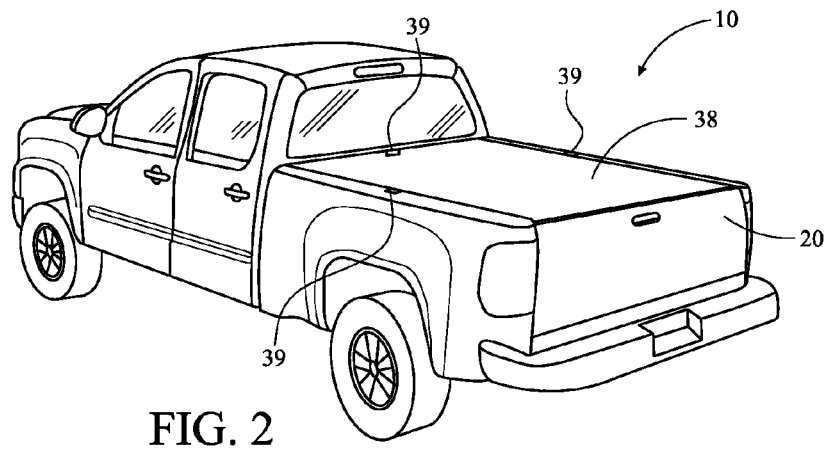
Figure 3:
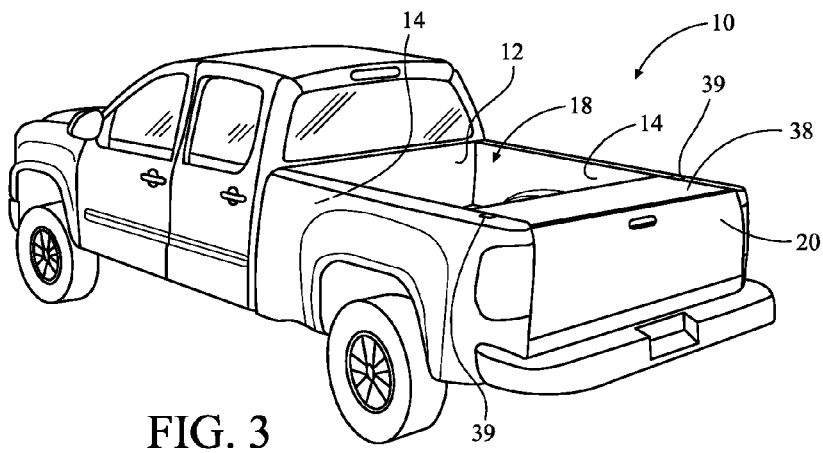

Referring to the drawings, wherein like reference numbers correspond to like or similar components wherever possible throughout the several figures, a vehicle 10 is shown in FIGS. 1, 2 and 3. The vehicle 10 generally has a front wall 12, two side walls 14, and a truck bed 16 that define a tonneau 18. While the vehicle 10 is shown as a pickup truck, it should be appreciated that it may be any vehicle that has walls and a floor or a base defining a tonneau. The vehicle 10 also has a tailgate 20 that may be attached to the side walls 14 and/or the truck bed 16. The tailgate 20 may be in an open position, in which the tonneau 18 may be accessible, or in a closed position, in which the tailgate 20 further defines the tonneau 18.

Figure 4:
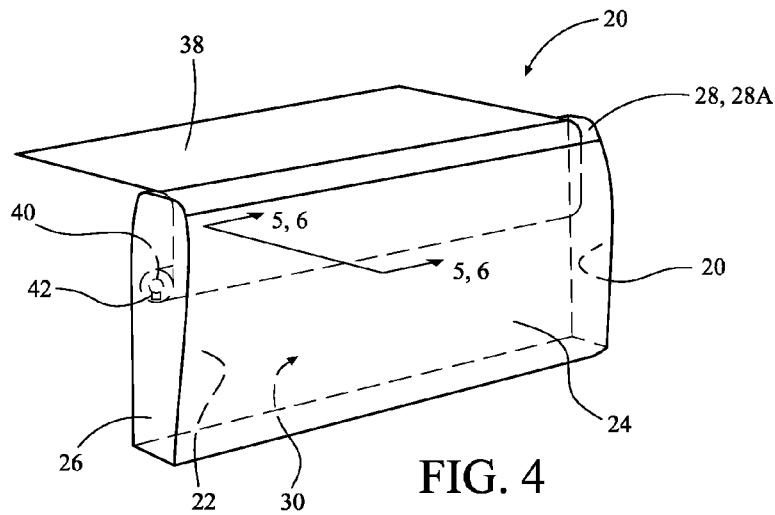
FIG. 4 is a schematic, perspective view of the tailgate of FIG. 3.
Figure 5:
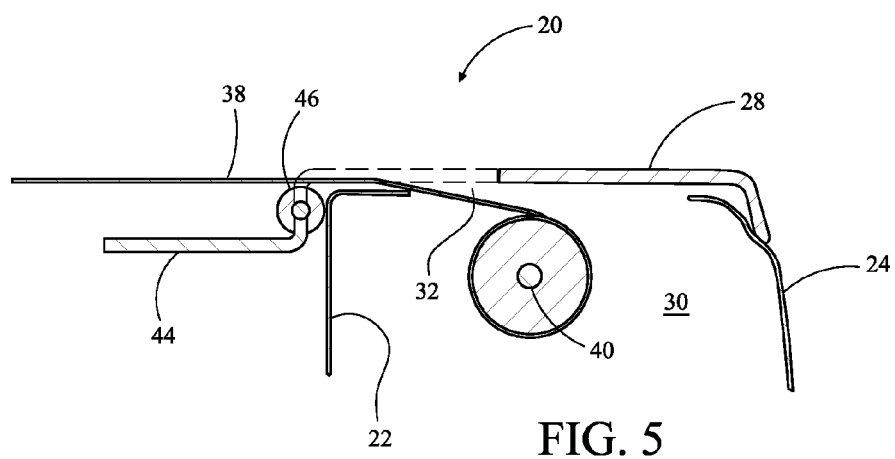
FIGS. 5 and 6 are schematic, partial cross-sectional views of the tailgate of FIG. 4 according to different embodiments.
Figure 6:
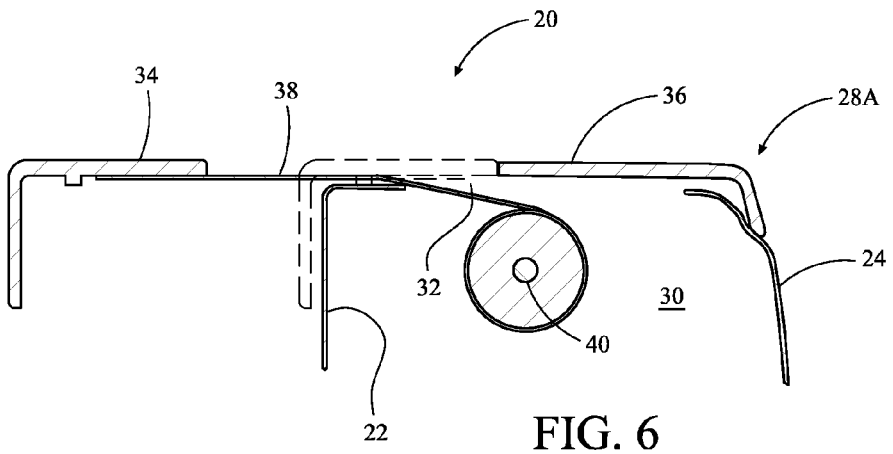

Referring now to FIG. 4, the tailgate 20 generally has a front panel 22, a rear panel 24, side panels 26, and a top panel 28 or 28A (depending upon the embodiment, as described below) that altogether define a cavity 30. In one embodiment, the front panel 22 and/or the top panel 28 may define an opening 32, as seen in FIG. 5 and described in more detail below. In another embodiment, the top panel 28A may include a front portion 34 and a rear portion 36. The front portion 34 may be removable from the rear portion 36 and the other panels 22, 24, and 26 to form the opening 32, as seen in FIG. 6 and described in more detail below.

The tailgate 20 also includes a tonneau cover 38 configured to cover the tonneau 18. The tonneau cover 38 generally is made of any pliable and rollable material, including, but not limited to, canvas, nylon, vinyl, polyphenylene oxide, any combination thereof, and the like. The material may be waterproof as well. The tonneau cover 38 may be selectively moved between a stowed position, as seen in FIG. 1, a deployed position, as seen in FIG. 2, and a partially deployed position, as seen in FIG. 3. In the stowed position, the tonneau cover 38 is substantially stored within the cavity 30. This serves to protect the tonneau cover 38, when not in use, from such things as cargo stored in the tonneau 18, as well as the elements. In the deployed position, the tonneau cover 38 substantially covers the tonneau 18. The partially deployed position is any position between the stowed position and the deployed position. The tonneau cover 38 may include at least one handle (not shown), strap, or the like to manually move the tonneau cover 38 between the stowed position, the partially deployed position, and the deployed position.

In either the partially deployed position or the deployed position, the tonneau cover 38 may be attached to the side walls 14 of the vehicle 10 such that the tonneau cover 38 is securely held in place. It may be attached via an attachment mechanism 39, which may be, but is not limited to, latches, straps, buckles, buttons, magnets, hooks, and the like. In the deployed position, the tonneau cover 38 (and/or the front portion 34 of the top panel 28A in such embodiments) may be further attachable to the front wall 12 of the vehicle 10 via another attachment mechanism 39. While FIGS. 2 and 3 show one attachment mechanism 39 on each side wall 14 and on the front wall 12, it should be appreciated that there may be any number of attachment mechanisms 39 on each wall 12 and 14.

It should be further appreciated that the attachment mechanism(s) 39 may be on only one wall 12 and 14. The vehicle 10 may also include rails or tracks (not shown), in which the tonneau cover 38 may be slidable, in or on top of the side walls 14.

To maintain the tonneau cover 38 within the cavity 30 and allow it to deploy, the tailgate 20 may include a spool 40 around which at least a portion of the tonneau cover 38 is wrappable. When the tonneau cover 38 deploys from the stowed position to the partially deployed position or the deployed position, the tonneau cover 38 may unravel from the spool 40. The spool 40 may be attached directly to the side panels 26, or indirectly via brackets or any other attachment hardware or mechanism (not shown).

The tailgate 20 may further include a retraction mechanism 42 configured to retract the tonneau cover 38 from the deployed position to the partially deployed position or the stowed position, and from the partially deployed position to the stowed position. The retraction mechanism 42 may be configured to bias the tonneau cover 38 to the stowed position such that when the attachment mechanism 39 attaching the tonneau cover 38 to the front wall 12 and/or the side walls 14 of the vehicle 10, as described above, is released, the tonneau cover 38 is automatically retracted into the cavity 30. The attachment mechanism 39 may be released manually or via a release mechanism, including, but not limited to a release button, switch, and the like. In another embodiment not shown, in lieu of the retraction mechanism 42, the tailgate 20 may include a motor configured to rotate the spool 40 counterclockwise and clockwise to automatically deploy and retract the tonneau cover 38. The motor may be connected to an existing electrical system within the vehicle 10, and may be operated by a button or a computer system within the vehicle 10.

Referring now to FIGS. 5 and 6, the tonneau cover 38 is deployable from and retractable to within the cavity 30 through the opening 32. As described above, in the embodiment depicted in FIG. 5, the front panel 22 and/or the top panel 28 may define the opening 32. In such an embodiment, the tailgate 20 may further include a lid 44 configured to substantially cover the opening 32 when the tonneau cover 38 is in the stowed position, as represented by the dashed lines in FIG. 5. The lid 44 does not have to completely seal the opening 32 as the tailgate 20 includes a drainage system (not shown). The lid 44 may be attached to any of the panels 22, 24, 26 and 28 via hinges 46, or any other similar attachment device, hardware, and/or mechanism, such that the lid 44 may be rotatably opened. The lid 44 may be opened toward or away from the tonneau 18. When opened toward the tonneau 18, the lid 44 and the hinges 46 may be located and configured such that the lid 44 rotates beneath the tonneau cover 38 when it is in the partially deployed position or in the deployed position, as seen in FIG. 5. In addition, the lid 44 may be operated manually or automatically via a motor (not shown). In other embodiments not shown, the lid 44 may be slidably opened, or may be removed completely.

Also as described above, in the embodiment depicted in FIG. 6, the top panel 28A may have a front portion 34 and a rear portion 36, where the front portion 34 is removable from the rear portion 36 and/or the other panels 22, 24, and 26 to form the opening 32. In such an embodiment, the tonneau cover 38 is integrated with the front portion 34 such that the tonneau cover 38 may be deployed by removing the front portion 34 and moving it toward the front wall 12 of the vehicle 10, as seen in FIG. 6. The dashed lines depict the front portion 34 being unremoved, and the tonneau cover 38 in the stowed position. When unremoved, the front portion 34 may or may not be connected with the rear portion 36 and/or the other panels 22, 24, and 26 via any removable or disengageable fasteners, latches, or the like (not shown). As mentioned above, the front portion 34, in addition to or in lieu of the tonneau cover 38, may be attached to the side walls 14 and/or the front wall 12 via the attachment mechanism 39 described above to maintain the tonneau cover 38 in the partially deployed position and the deployed position.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A tailgate for a vehicle having a front wall, two side walls, and a truck bed altogether defining a tonneau, the tailgate comprising:
   a front panel, a rear panel, a top panel, and two side panels altogether defining a cavity, wherein at least one of the front panel, the rear panel, the top panel, and the two side panels defines an opening extending therethrough, and the cavity is accessible through the opening; and
   a tonneau cover deployable from within the cavity through the opening, the tonneau cover being selectively movable between a stowed position, a deployed position, and a partially deployed position;
   wherein the tonneau cover is substantially within the cavity in the stowed position, and substantially covering the tonneau in the deployed position; and
   wherein the partially deployed position is any position between the stowed position and the deployed position; and
   a spool around which at least a portion of the tonneau cover is wrappable, wherein the spool is attached to the side panels.

2. The tailgate of claim 1 wherein the tonneau cover is attachable to at least one of the two side walls and the front wall of the vehicle via at least one attachment mechanism such that the tonneau cover is maintainable in at least one of the deployed position and the partially deployed position.

3. The tailgate of claim 1 further comprising a lid configured to substantially cover the opening, and further configured to allow the tonneau cover to pass through the opening when moving between the stowed position, the deployed position, and the partially deployed position.

4. The tailgate of claim 3 wherein the lid is attached to at least one of the front panel, the rear panel, the two side panels, and the top panel.

5. The tailgate of claim 1 further comprising a refraction mechanism configured to retract the tonneau cover into the cavity.

6. A tailgate for a vehicle having a front wall, two side walls, and a truck bed altogether defining a tonneau, the tailgate comprising:
   a front panel, a rear panel, a top panel, and two side panels altogether defining a cavity, the top panel having a front portion and a rear portion, the front portion being removable from at least the rear portion to form an opening through which the cavity is accessible; and
   a tonneau cover integrated with the front portion of the top panel, the tonneau cover being deployable from and retractable to within the cavity through the opening, the tonneau cover being selectively movable between a stowed position, a deployed position, and a partially deployed position;

wherein the tonneau cover is substantially within the cavity in the stowed position, and substantially covering the tonneau in the deployed position; and wherein the partially deployed position is any position between the stowed position and the deployed position.

7. The tailgate of claim 6 wherein at least one of the tonneau cover and the front portion of the top panel is attachable to at least one of the two side walls and the front wall of the vehicle via at least one attachment mechanism such that the tonneau cover is maintainable in at least one of the deployed position and the partially deployed position.

8. The tailgate of claim 6 further comprising a spool around which at least a portion of the tonneau cover is wrappable, the spool being attached to the side panels.

9. The tailgate of claim 6 further comprising a retraction mechanism configured to retract the tonneau cover into the cavity.

10. A vehicle comprising:
a front wall, at least two side walls, and a truck bed altogether defining a tonneau; and
a tailgate movably coupled to the truck bed such that the tailgate is movable relative to the truck bed between an open position and a closed position, wherein the tailgate includes:
a front panel, a rear panel, a top panel, and two side panels altogether defining a cavity; and
a tonneau cover deployable from and retractable to within the cavity, the tonneau cover being selectively movable between a stowed position, a deployed position, and a partially deployed position;
wherein the tonneau cover is substantially within the cavity in the stowed position, and substantially covering the tonneau in the deployed position; and
wherein the partially deployed position is any position between the stowed position and the deployed position; and wherein the tonneau cover is movable relative to the tailgate from the deployed position to the stowed position in the cavity while the tailgate is in the closed position.

11. The vehicle of claim 10 wherein the top panel of the tailgate has a front portion and a rear portion, the front portion being removable from at least the rear portion to form an opening through which the cavity is accessible.

12. The vehicle of claim 11 wherein the tonneau cover of the tailgate is integrated with the front portion of the top panel.

13. The vehicle of claim 10 wherein at least one of the top panel and the front panel, the rear panel, the two side panels, and the top panel of the tailgate define an opening through which the cavity is accessible.

14. The vehicle of claim 13 wherein the tailgate further comprises a lid configured to substantially cover the opening, and further configured to allow the tonneau cover to pass through the opening when moving between the stowed position, the deployed position, and the partially deployed position.

15. The vehicle of claim 14 wherein the lid is attached to at least one of the front panel, the rear panel, the two side panels, and the top panel.

16. The vehicle of claim 10 wherein the tonneau cover of the tailgate is attachable to at least one of the two side walls and the front wall via at least one attachment mechanism such that the tonneau cover is maintainable in at least one of the deployed position and the partially deployed position.

17. The vehicle of claim 10 wherein the tailgate further comprises a spool around which at least a portion of the tonneau cover is wrapped, the spool being attached to the side panels of the tailgate.

18. The vehicle of claim 10 wherein the tailgate further comprises a retraction mechanism configured to retract the tonneau cover into the cavity.

* * * * *